Patented Feb. 26, 1929.

1,703,362

UNITED STATES PATENT OFFICE.

METHODI POPOFF, OF BERLIN, GERMANY, ASSIGNOR TO BAYERISCHE STICKSTOFF WERKE AKTIENGESELLSCHAFT, OF BERLIN, GERMANY, A JOINT-STOCK COMPANY OF GERMANY.

PROCESS OF STIMULATING THE GERMINATION OF SEEDS AND OTHER VEGETABLE MATTER AND IN STIMULATED VEGETABLE MATTER.

No Drawing. Application filed March 18, 1925, Serial No. 16,575, and in Germany May 23, 1924.

My invention relates to improvements in the process of stimulating the germination of seeds and other vegetable matter, and in stimulated vegetable matter, and more particularly in the process in which the seeds are treated with solutions of certain salts, the object being to improve the inner breathing of the seeds. As is known to those skilled in the art by such stimulation the plants are raised more rapidly and vigorously and they develop stronger roots and stalks. Further the plants develop better and larger leaves of a dark green colour, and the yield of the crop is increased by 30 per cent and more. There are numerous salts and other substances having stimulating action. But for each kind of seeds definite substances have the best results. For example in connection with oats certain salts and mixtures of salts have strong stimulating action, while in connection with seeds of cabbages other salts are preferred. Further, the stimulating medium should be used in definite concentration and for definite periods of time.

I have discovered that seeds which have been subjected to stimulation, and which have been rapidly and perfectly dried in the air, have a largely increased germination as compared to non-stimulated seeds, even after being stored for a year. The germinating power of seeds obtained from plants raised from the said stimulated seeds is further increased when again treating the same with stimulating media. I have discovered that the germinating energy may thus be increased two or three times, and it remains constant in the third generation after having attained a certain optimum. To avoid premature germination the seeds are preferably heated at a temperature of from 30 to 55° C., which heating may be done before or after stimulation. Therefore the farmer may buy stimulated seeds and store the same a comparatively long time. Further I have discovered that the stimulating effect is improved and made more reliable when proceeding as follows: I divide the seeds in portions which are as nearly as possible alike in weight and treat the said portions with different stimulating solutions, dry the portions, and mix the same shortly before sowing. The more the seeds are thus subdivided when separately stimulating the same the better is the result of the stimulation. I shall term this method of stimulating separate amounts of grain "polystimulation".

I have found that this polystimulation is particularly important in view of the varying climatic conditions of the year in which the seeds are sown. By stimulating the seeds the character of the growth is changed, and the portions of seeds which have been subject to different treatment and mixed before sowing and the plants growing from the said seeds, react in view of their different character in different ways on the atmospheric or climatic conditions, so that unfavorable conditions of weather do not impair the whole mass of the seeds.

As has been stated above there are stimulating media such as salts and mixtures of salts, which are specifically effective in connection with different seeds. For example, in the poylstimulation of the grains: rye, wheat, barley, oats, I divide the mass of grain into equal portions, and I treat one of the said portions with magnesium chlorid ($MgCl_2$) and magnesium sulfate ($MgSO_4$), while the other portion is treated, in case of rye, with potassium bromid (KBr), in case of wheat and oats, with a mixture of magnesium sulfate ($MgSO_4$) and manganese sulfate ($MnSO_4$), and in case of barley, with a mixture of magnesium chlorid ($MgCl_2$), manganese nitrate ($Mn[NO_3]_2$) and magnesium sulfate ($MgSO_4$).

After the portions have thus been treated with solutions of the said salts they are dried in the open air, stored, and mixed shortly before sowing.

Example 1.

140 kilogrammes of rye are divided into two equal portions of 70 kilogrammes each. One of the said portions is treated with 3.0 kilogrammes of a stimulating medium consisting of a solution of from 1.0 to 1.5 kilogrammes of $MgCl_2$ plus from 1.0 to 1.5 kilogrammes of $MgSO_4$ in 100000 cubic centimeters of water having a temperature of from 25 to 30° C., the rye being steeped into the said solution and left therein three hours.

The other portion of the rye is treated three hours with 300 grammes of a stimulating medium consisting of 300 grammes of KBr in 100000 cubic-centimeters of water having a temperature of from 25 to 30° C.

The portions are separately dried, stored, and mixed before being sown.

*Example 2.*

140 kilogrammes of wheat are divided into two equal portions. One of the said portions is treated with three kilogrammes of a stimulating medium consisting of a solution of from 1.0 to 1.5 kilogrammes of $MgCl_2$ plus from 1.0 to 1.5 kilogrammes of $MgSO_4$ in 100000 cubic-centimeters of water having a temperature of from 25 to 30° C., the wheat being steeped into the said solution and left therein three hours.

The other portion of the wheat is treated four hours with 3.0 kilogrammes of a stimulating medium consisting of a solution of from 1.0 to 1.5 kilogrammes of $MgSO_4$ plus from 1.5 to 2.0 kilogrammes of $MnSO_4$ in 100000 cubic-centimeters of water having a temperature of from 25 to 30° C.

The said portions are separately dried, stored, and mixed before being sown.

*Example 3.*

100 kilogrammes of oats are divided into two equal portions. One of the said portions is treated with three kilogrammes of a stimulating medium consisting of a solution of from 1.0 to 1.5 kilogrammes of $MgCl_2$ plus from 1.0 to 1.5 kilogrammes of $MgSO_4$ in 100000 cubic-centimeters of water having a temperature of from 25 to 30° C., the oats being steeped into the said solution and left therein six hours.

The other portion of the oats is treated six hours with 3.0 kilogrammes of a stimulating medium consisting of a solution of from 1.0 to 1.5 kilogrammes of $MgSO_4$ plus 1.5 to 2.0 kilogrammes of $MnSO_4$ in 100000 cubic-centimeters of water having a temperature of from 25 to 30° C.

The said portions are separately dried, stored, and mixed before being sown.

*Example 4.*

130 kilogrammes of barley are divided into two equal portions. One of the said portions is treated with three kilogrammes of a stimulating medium consisting of a solution of from 1.0 to 1.5 kilogrammes of $MgCl_2$ plus 1.0 to 1.5 kilogrammes of $MgSO_4$ in 100000 cubic-centimeters of water having a temperature of from 25 to 30° C., the barley being steeped into the said solution and left therein five hours.

The other portion of the barley is treated four hours with 2.4 kilogrammes of a stimulating medium consisting of a solution of from 1.0 to 1.5 kilogrammes of $MgCl_2$, 0.3 to 0.7 kilogrammes of $Mn(NO_3)_2$ and 0.6 to 1.3 kilogrammes of $MgSO_4$ in 100000 cubic-centimeters of water having a temperature of from 25 to 30° C.

The said portions are separately dried, stored, and mixed before being sown.

*Example 5.*

Any of the seeds referred to in the Examples 1 to 4 are treated in the manner described in the said examples, whereupon the following generation or generations are stimulated in the same way.

In all the examples the seeds may be heated before or after stimulating the same.

I claim:

1. The herein described method of stimulating the germinating power and increasing the yield of agricultural or horticultural seeds, which consists in separately treating portions of the said seeds with different stimulating media, mixing the said portions, and planting the same.

2. The herein described method of stimulating the germinating power and increasing the yield of agricultural or horticultural seeds, which consists in separately treating substantially equal portions of the said seeds with different stimulating media, mixing the said portions, and planting the same.

3. The herein described method of stimulating the germinating power and increasing the yield of agricultural or horticultural seeds, which consists in separately treating portions of the said seeds with different stimulating media, drying and mixing the said portions, and planting the same.

4. The herein described method of stimulating the germinating power and increasing the yield of agricultural or horticultural seeds, which consists in separately treating substantially equal portions of the said seeds with different stimulating media, drying and mixing the said portions, and planting the same.

5. The herein described method of stimulating the germinating power and increasing the yield of agricultural or horticultural seeds, which consists in separately treating portions of the said seeds with different stimulating media, rapidly drying said portions at the air and at low temperature, and mixing and planting the same.

6. The method of stimulating the germinating power and increasing the yield of agricultural or horticultural seeds, as specified in claim 1, which consists in stimulating and planting successive generations of the said seeds.

7. The herein described method of stimulating the germinating power and increasing the yield of agricultural or horticultural seeds, which consists in stimulating portions of the seeds with different stimulating media, mixing the said portions, planting the same, and stimulating the seeds obtained from the plants.

8. The herein described method of stimulating the germinating power and increasing the yield of agricultural or horticultural seeds, which consists in stimulating portions of the seeds with different stimulating media, mixing the said portions, planting the same, separately stimulating portions of the seeds obtained from the plants, and mixing the said portions.

9. The herein described method of stimulating the germinating power and increasing the yield of agricultural or horticultural seeds, which consists in separately treating portions of the said seeds with different stimulating media, rapidly drying said portions at the air and at a temperature of from 30 to 55 degrees centigrade, and mixing and planting the same.

10. The herein described method of stimulating the germinating power and increasing the yield of agricultural or horticultural seeds, which consists in heating the said seeds at a temperature of from 30 to 55° C., separately treating portions of the said seeds with different stimulating media, mixing the said portions, and planting the same.

11. The herein described method of stimulating the germinating power of rye, which consists in treating one portion of the rye with a watery solution of ten parts of chlorid of magnesium ($MgCl_2$) and ten parts of magnesium sulfate ($MgSO_4$), and another portion with a solution containing three parts of bromid of potassium (KBr), mixing said portions, and sowing the same.

12. The herein-described method of stimulating the germinating power of wheat and oats, which consists in treating one half of the wheat or oats with a watery solution of ten parts of chlorid of magnesium ($MgCl_2$) and ten parts of sulphate of magnesium ($MgSO_4$), and the other half of the wheat or oats with a watery solution of ten parts of sulphate of magnesium ($MgSO_4$) and twenty parts of maganese sulphate ($MnSO_4$) and mixing the said two halves after treatment.

13. The herein described method of stimulating the germinating power of barley, which consists in treating one portion of the barley with a solution containing ten parts of chlorid of magnesium ($MgCl_2$) and ten parts of sulfate of magnesium ($MgSO_4$) and another portion of the barley with a solution containing thirteen parts of nitrate of manganese ($Mn[NO_3]_2$) and 6 parts of sulfate of magnesium ($MgSO_4$).

14. The herein described method of raising plants, which consists in mixing portions of seeds or grains previously treated with different media adapted to stimulate germination, and sowing the mixture.

15. The herein described matter, which consists of a mixture of portions of seeds or grain treated with different media adapted to stimulate germination.

16. The herein described matter, which consists of a mixture of equal portions of seeds or grain treated with different media adapted to stimulate germination.

In testimony whereof I hereunto affix my signature.

PROF. DR. M. POPOFF.